(12) United States Patent
Yasue (10) Patent No.: US 6,289,345 B1
(45) Date of Patent: Sep. 11, 2001

(54) DESIGN INFORMATION MANAGEMENT SYSTEM HAVING A BULK DATA SERVER AND A METADATA SERVER (75) Inventor: Mitsuru Yasue, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,850

(22) Filed: Feb. 9, 1998

(30) Foreign Application Priority Data

Jun. 26, 1997 (JP) ................................. 9-169335

(51) Int. Cl.[7] .................................................. G06F 17/30
(52) U.S. Cl. ................................................ 707/10; 714/4
(58) Field of Search ........................ 364/468.01, 468.02, 364/468.03, 468.04; 707/10–9, 502; 714/4

(56) References Cited

U.S. PATENT DOCUMENTS

| 4,809,170 | * | 2/1989 | Leblang et al. | ........................ | 395/703 |
| 5,490,097 | * | 2/1996 | Swenson et al. | ................ | 395/500.23 |
| 5,528,503 | * | 6/1996 | Moore et al. | .................... | 364/468.01 |
| 5,579,231 | * | 11/1996 | Sudou et al. | ....................... | 364/468.1 |
| 5,586,254 | * | 12/1996 | Kondo et al. | ........................... | 714/25 |
| 5,787,000 | * | 7/1998 | Lilly et al. | ......................... | 364/468.1 |
| 5,864,482 | * | 1/1999 | Hazama et al. | ................. | 364/468.01 |
| 5,978,804 | * | 11/1999 | Dietzman | .............................. | 707/10 |

* cited by examiner

Primary Examiner—Hosain T. Alam
Assistant Examiner—Jean B. Fleurantin
(74) Attorney, Agent, or Firm—Staas & Halsey LLP (57) ABSTRACT A data information management system for 2D/3D model data which unwarily manages design information in the form of bulk data. The system allows for real time information transmission of device/component data and eases data cooperation between the design side and the manufacturing side. The unitary management of the management information of model data is performed by a common metaserver. A plurality of bulk servers respectively maintain, for example according to category, the individual model data which has been designed. Workstations, which access design information, acquire management information of model data from the metaserver. Based on the management information, the workstations access the appropriate bulk server which maintains the required model data. During implementing/updating of the model data, management information is registered by the metaserver, and model data is stored in the bulk servers. The metaserver, bulk servers, and workstations perform communication via a WAN or LAN network.

15 Claims, 11 Drawing Sheets

METADATA

| COMPONENT NO. | a |
|---|---|
| COMPONENT NAME | XX ASSEMBLY COMPONENT |
| TOOL | 3-D CAD |
| LOCATION HOST | BULK-1 |
| LOCATION SITE | /USR/TEMP/1432 |
| OWNERSHIP GROUP | 1432 |

| COMPONENT NO. | a1 |
|---|---|
| COMPONENT NAME | XX ASSEMBLY FOUNDATION |
| TOOL | 3-D CAD |
| LOCATION HOST | BULK-1 |
| LOCATION SITE | /USR/TEMP/1111 |
| OWNERSHIP GROUP | 1111 |

| COMPONENT NO. | a2 |
|---|---|
| COMPONENT NAME | XX TOWER UNIT |
| TOOL | 3-D CAD |
| LOCATION HOST | BULK-1 |
| LOCATION SITE | /USR/TEMP/2222 |
| OWNERSHIP GROUP | 2222 |

COMMON COMPONENT INFORMATION MASTER TABLE 13

| COMMON COMPONENT NUMBER | PRINT NUMBER | DESIGNER | DESIGN DATE | MANAGEMENT GROUP | DATE OF LAST UPDATE |
|---|---|---|---|---|---|
| CA12345-6789 | 001 | 970001 | 970430 | 1432 | 970430 |
| CA12345-6789 | 002 | 970002 | 970501 | 1432 | 970501 |
| CA22222-1234 | 003 | 970003 | 960501 | 2345 | 960501 |

FIG. 12A

USER AUTHORITY MASTER TABLE 14

| LOGIN ID | LOGIN PASSWORD | ACCESS GROUP | MAIL ADDRESS | ROLE (*) | ROLE NO. |
|---|---|---|---|---|---|
| L1234 | ****** | 4321 | YASUE@FJ.CO.JP | DESIGNER | 15 |
| L1111 | ****** | 4444 | FOO@FJ.CO.JP | APPROVER | 12 |

FIG. 12B

MODEL DATA STORAGE DESTINATION MASTER TABLE 15

| ACCESS GROUP | ACCESS HOST | ACCESS VOLUME | ACCESS HOST -IP ADDRESS |
|---|---|---|---|
| 4321 | BULK-1 | /USR/TMP/4321 | 133.111.23.10 |
| 4444 | BULK-2 | /USR/TMP/4444 | 133.161.11.11 |
| 5432 | BULK-3 | /OPT2/CAD/DATA | 133.161.12.12 |

FIG. 12C

DESIGN INFORMATION MANAGEMENT SYSTEM HAVING A BULK DATA SERVER AND A METADATA SERVER

CROSS-REFERENCE TO RELATED APPLICATIONS

This application claims the benefit of Japanese Application No. 9-169335 which is hereby incorporated by reference.

BACKGROUND OF THE INVENTION

The present invention relates to a design information management system, a design information access device and a program memory medium. More specifically, the present invention relates to a design information management system which performs design information management as a data transmission method from a design stage to a manufacturing stage.

For manufacturing devices having various constituent components, the designer (or design group also more generically referred to as the design department) designs the individual components using 3-dimensional CAD software and the like, and delivers drawings of a designed 3-dimensional model data to a manufacturing group (manufacturing department). The manufacturing group, consulting the design information contained in the drawings, performs manufacture of the devices and their constituent components.

In such a design/manufacturing system, the principal technology is typically one of the following:

(a) In work stations loaded with a 3-dimensional modeling system, 3-dimensional model data is managed by independent data management methods.
Management is limited to the individual work stations.

(b) Drawings are prepared as manufacturing data from individual 3-dimensional model data. The manufacturing drawings are managed and intensified for distribution using a separate computer. The printed out paper drawings are then distributed to the manufacturing positions.

(c) The common component data of plurality of devices or components used in common, provides data to the design side based on common component management provision.

The technology involved with option (a) has the following problems:

1: The same component information is scattered among various workstations, making centralized data management is impossible. This also implies the duplication of work.

2: When designing components which resemble existing components whose model data are not in the industrial workstations, it is impossible to utilize existing model data.

3: Because design changes are individually incorporated into the model, it is difficult to grasp the effects of the individual components which constitute the device as a whole. The problem is multiplied when the various individual components are being designed on a high number of different individual workstations.

4: Because there is no unitary management of the device and components, the change process, etc., of model data is individually carried out.

The technology involved with option (b) has the following problems:

1: Because the distributed manufacturing data are paper drawings, data has to be transmitted to a workstation, which performs special processing, for practical use of this raw data.

2: Because the computer used for management of manufacturing drawings and the computer used for creation and storage of the 3-dimensional model data are different, there is no linking relationship between the drawings management information and the 3-dimensional model data.

The technology involved with option (c) has the following problems:

1: Devices and components using common components cannot be managed.

2: Notification of changes in common components is slow, increasing development time, hindering of component preparation.

SUMMARY OF THE INVENTION

Accordingly, it is an object of the present invention to provide unitary management of design information bulk data, making real time information transmission of device/component data possible.

It is also an object of the present invention to provide smooth data cooperation between the design and manufacturing stages.

Additional objects and advantages of the invention will be set forth in part in the description which follows, and, in part, will be obvious from the description, or may be learned by practice of the invention.

Objects of the present invention are achieved in a design information management system having a design information metadata for design information management, 3-dimensional model data which cooperates with the metadata. The metadata includes constitution management information which indicates the constitution of the device including the components of the device. The metadata, including constitutional management information, and location information, are stored in a database on a common metaserver. 3-dimensional model data, prepared during the design stage, are stored in bulk servers. The bulk servers may be divided up and assigned to various departments. A design access device used during the design or manufacturing stages, obtains the location data for each constituent component of a device from the metaserver via a network. Based on the location data the design access device extracts, as necessary, the model data from the database of a bulk server which stores the model data.

Objects of the present invention are also achieved in a system, as set forth above, using attribute information, stored in the metaserver, giving user authority information indicating the ability (i.e., propriety) of a user to make changes to a component object. The design information access device, when design information is updated, consults the user authority information.

Objects of the present invention are achieved in a system, as set forth above, using attribute information including information showing whether a component is a common component, i.e., whether the component is used in a plurality of devices or components. The design information access device, when design information is updated, checks whether the updated design information relates to common components. When the component is a common component, the change of the common component is notified to the other users or managers of the common component.

Objects of the present invention are also achieved in a design information access device in which model data is exported/transferred from a bulk server based on constitutional information relating to the device and components which the metaserver manages. An extraction process extracts, in batch form, the model data relating to the component group, i.e., those that have a parent or child relationship to the component at issue.

Objects of the present invention may also be achieved in a program stored on a suitable information medium which a computer can read out. The program accesses constitutional information relating to the devices and components. Attribute information containing information of storage locations of model data of objects relating to these devices and components is stored in a metaserver. Based on the information of storage locations in the attribute information, new or updated model data is imported by the program. Based on the information of storage locations in the attribute information, model data is extracted by the program from the appropriate bulk server and transferred to a requesting workstation.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Reference will now be made in detail to the present preferred embodiment of the present invention, examples of which are illustrated in the accompanying drawings, wherein like reference numerals refer to like elements throughout.

Figure 1:
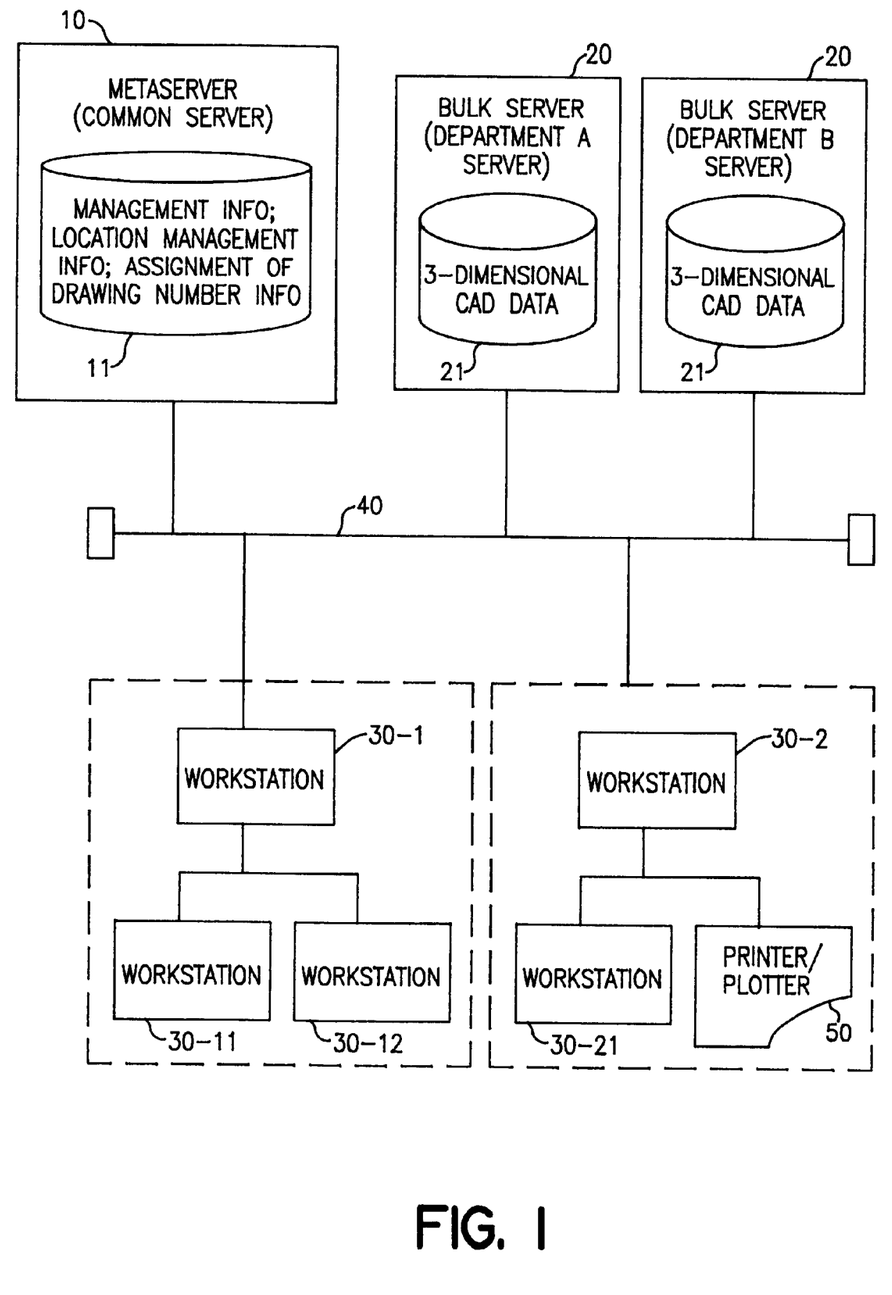
FIG. 1 is a block diagram of the basic concept of the present invention.

FIG. 1 is a block diagram of the basic concept of the present invention. A metaserver 10 unwarily manages management information regarding the model data. Model data expresses the shape of an item, while design data is a group of data, including model data, that relate to the design and manufacturing of a device (typically made up of various items). Model data when viewed as a whole forms bulk data. In general, individual model data comprises the actual data for creating/recreating a CAD drawing. A metadatabase 11 maintains the metaserver 10 including management information of the model data in, for example, a relationship database. Bulk servers 20 (arranged by department) store the individual model data. Bulk data 21 is stored on the bulk servers 20, and, as set forth above, consist of 2-dimensional or 3-dimensional model data, for example, 3-dimensional CAD data and the like.

A workstation 30 acquires the management information regarding the model data from the metaserver 10 and, based on the management information, obtains the model data, for processing, by accessing the bulk server 20. In the example shown in FIG. 1, workstations 30-1, 30-11, 30-12 form a design system (for use by the design department), while workstations 30-2, 30-21 form a manufacturing system (for use by the manufacturing department in the manufacturing plant). A printer/plotter 50 on the manufacturing system outputs the completed manufacturing drawings.

The entire system is tied together via a network 40, which for example, comprises a WAN or a LAN. In other words, the workstations 30, the common metaserver 10, and the bulk servers 20 (which are located according to departments, that is, Department A (design, for example), Department B (manufacturing, for example), are connected by the network 40. The location information of the model data and constitution information regarding the model data (single stage/multi-stage component constitution, object drawing number, and the like) are stored in the metadatabase 11 on the common metaserver 10. The actual model data, prepared by the design department on the design system, is stored in the databases of the bulk server 20 (depending on the department).

In general, the design and manufacture departments, when the design data is used by a workstation 30 in one of the departments, access the bulk data 21 on the appropriate bulk server 20 using location management information extracted from the metadatabase 11.

Control of the ability of individual users to modify the model data is provided for in management information regarding common components, which the metaserver 10 manages. By modifying user authority information the system manages the propriety of any requested modification. Moreover, when a design system has modified a common component (in the design category or manufacturing category of other components) a common component modification notification is issued to other users of the common component, to draw their attention to the change. This notification may be issued using e-mail or other such system, BBS etc.

The metaserver 10 centrally manages all the model data and related design information comprising the bulk data 21. Because management is dispersed from the various categories of bulk servers 20, real time information transmission of device/component data is possible between the various departments. In comparison with centralizing the metadata and all of the bulk data onto one host processor, load dispersion is possible. Moreover, because bulk data can be located very close to the place of use, communication costs are reduced as only the management information is remotely retrieved.

Figure 2:
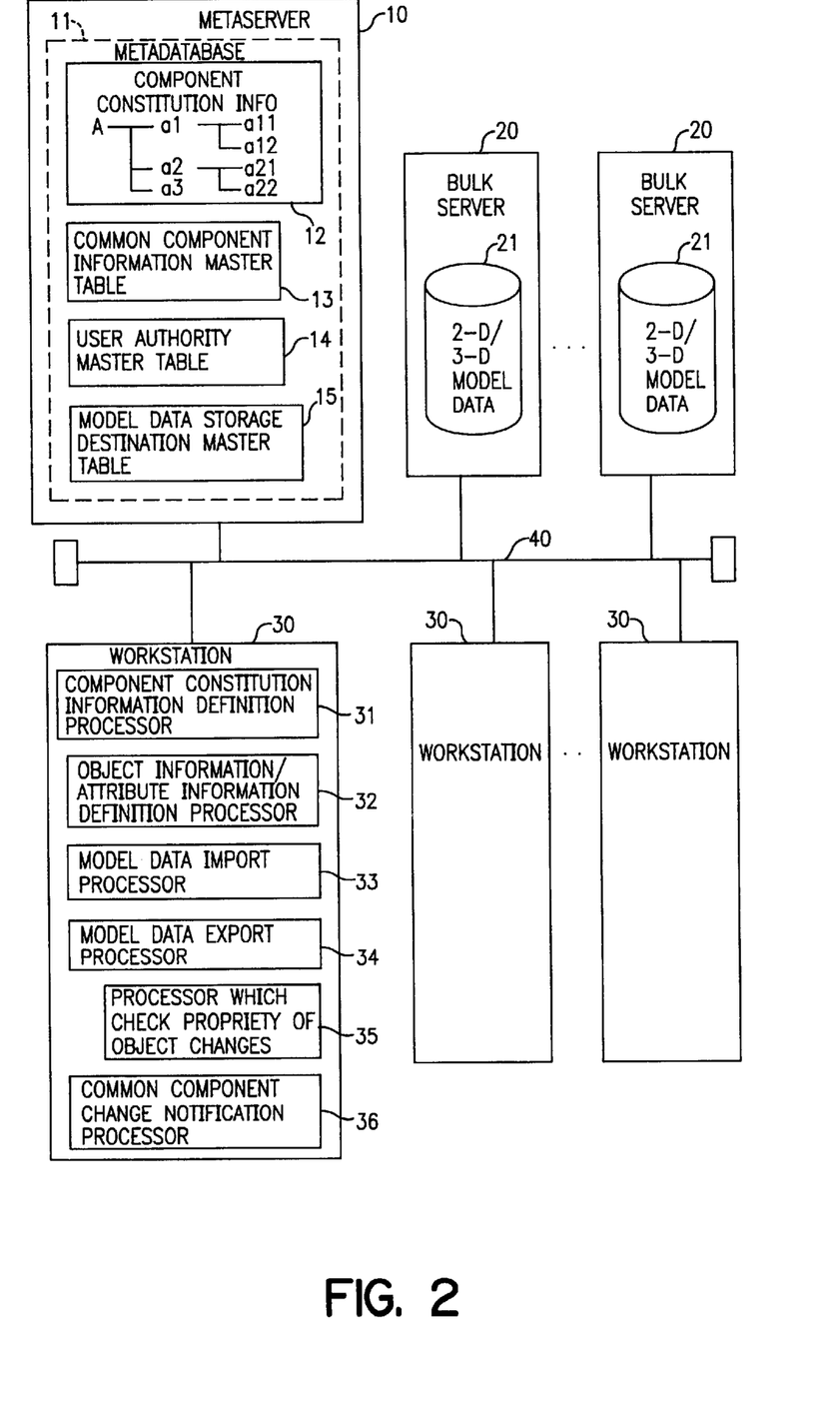
FIG. 2 is a block diagram of the present invention.

FIG. 2 is a block diagram of the present invention. Component constitution information 12, stored in the metadatabase 11, indicates what other components are in a particular device and component. For example, using a tree structure, it can be seen that device A comprises components a1, a2, a3, and that component a1 comprises components a11, a12, while component a2 comprises components a21, a22. The term "device" typically refers to the top level structure in any particular diagram/drawing/figure, while the term "component" typically refers to the subparts of a device or component.

A common component information master table 13 stores information relating to components used in common among various devices or components, typically referred to as "common components". A user authority master table 14 stores information about each users'access authority to the model data. A model data storage destination master table 15 stores the storage destination, i.e., location, information of the model data in bulk data 21 on the bulk servers 20. The master tables 13, 14, and 15 are typically tables in a relational database, but are not necessarily limited to such. However, if the master tables 13, 14, and 15 are part of a relational database, a general purpose relational database management system may be located in the metaserver 10, thereby allowing easy access to the necessary data from each workstation 30 via a relational database access function.

Each workstation 30 which accesses design data has a component constitution information definition processing means 31 which defines the designed components or devices constitution information, i.e., what subparts each device or component is constructed from. An object information/attribute information definition processor 32 defines the designed object's information and associated attribute information. A model data import processor 33 imports/transfers designed model data from the workstation 30 to the bulk server 20. A model data export processor 34 which exports/transfers model data from the bulk server 20 to the workstation 30. A processor 35 checks the propriety of model changes, i.e., where a user has authority to perform a change to a device or a component. Finally, when the management information or model data of a common component has been changed, a common component change notification processor 36 notifies the appropriate users and managers that a common component was changed. The processors 31, 32, 33, 34, 35, and 36 are typically formed in software, but can comprise individual hardware components, such as microprocessors.

Figure 3A:
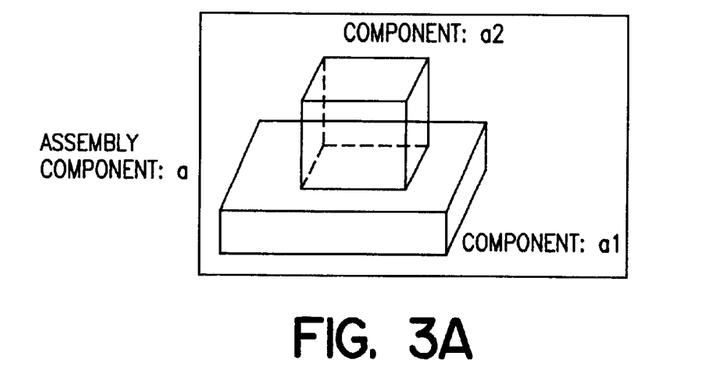
FIGS. 3A and 3B are diagrams illustrating a device and its related metadata, respectively.
Figure 3B:
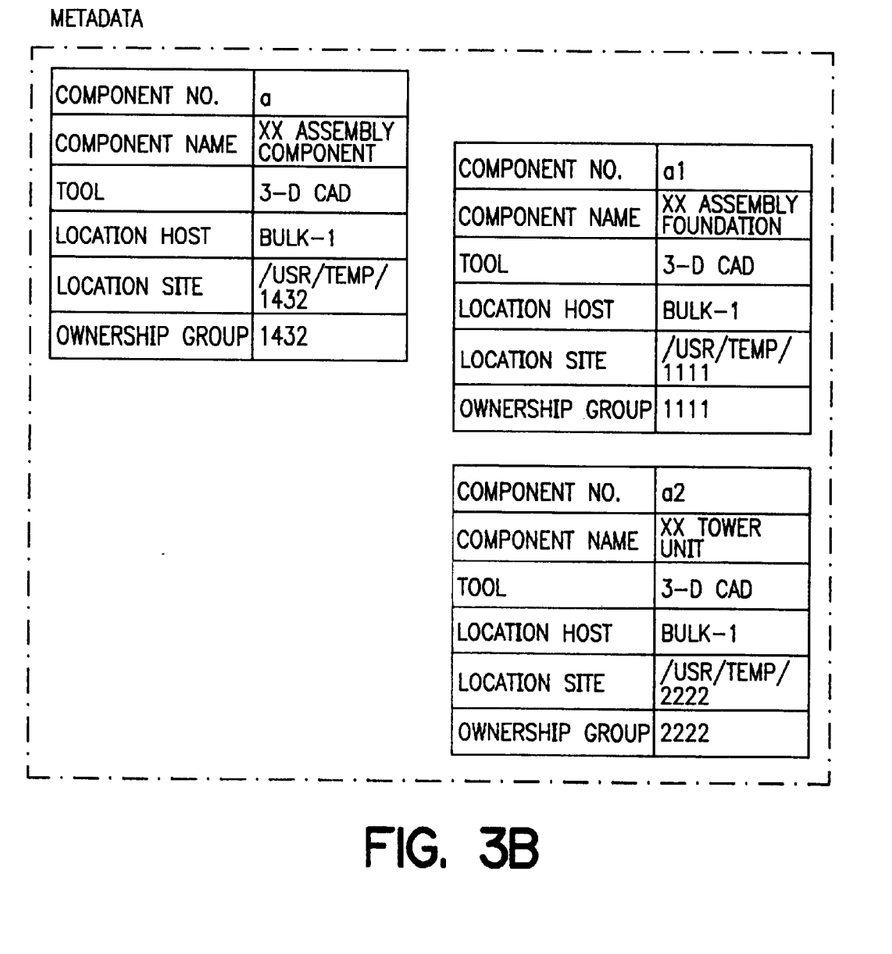

FIGS. 3A and 3B are diagrams of a device and its associated metadata. Looking at FIG. 3A, bulk data 21 is divided up into model data which has been prepared by a 3-dimensional CAD system or the like. In this example, the model data describes a device (called "assembly component a") which comprises a component a1 and a component a2. Looking at FIG. 3B, the related metadata comprises management information including attribute information regarding the objects in the component or device, i.e., the components a, a1 and a2. The metadata contains, for each component, a component number, a component name, a name of the CAD software or the like program which prepared the model data describing the component, a host memory location of the model data, a directory name and a file name (or other indication of a location in the host), the name of the owner group which is the manager of the model data, and other pertinent information.

Figure 4:
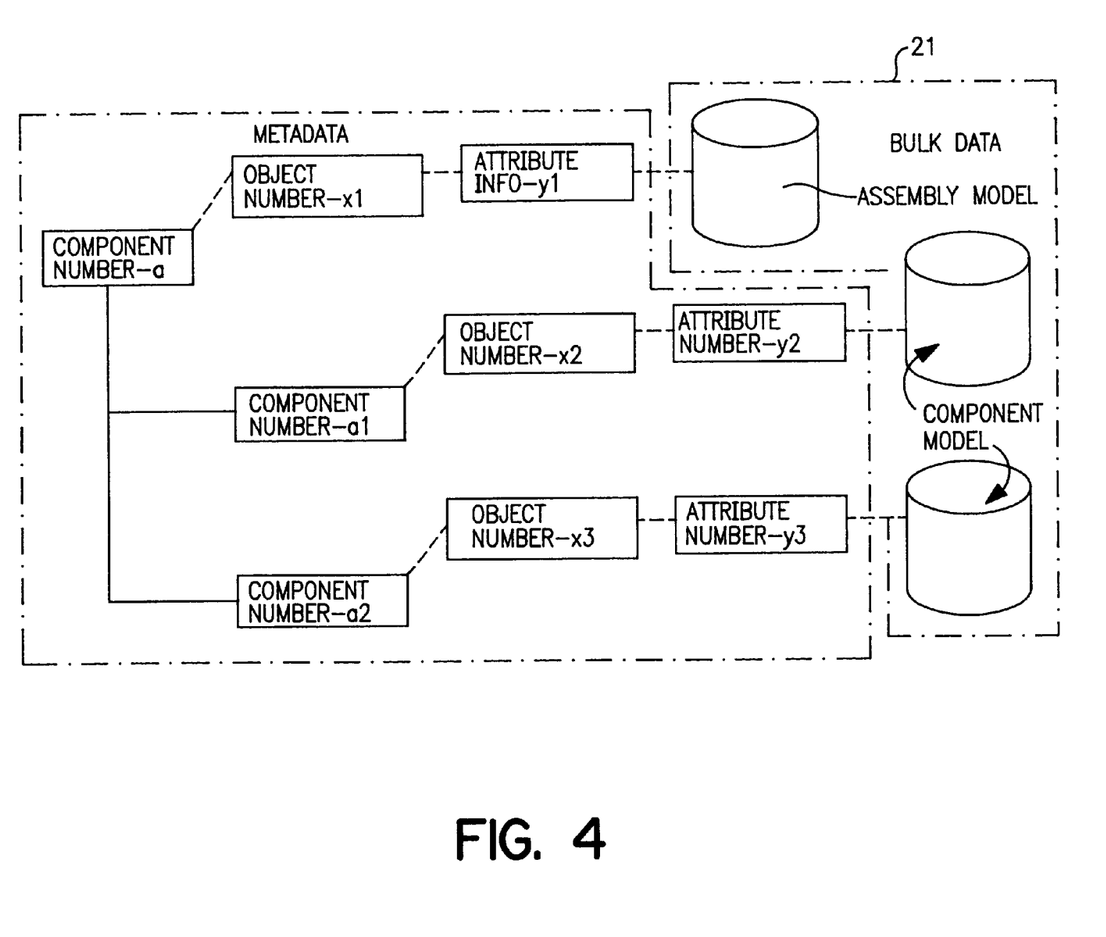
FIG. 4 is a diagram showing the relationship between metadata and bulk data.

FIG. 4 is a diagram showing the relationship between metadata and bulk data. The objects formed by the model data, and the like, are simply treated as "objects". Each component is managed using a hierarchical structure. The component numbers a, a1, a2 of respective components are linked with data (objects) having object numbers x1, x2, x3. Attribute information y1, y2, y3 are defined for, and linked to, each object. The attribute information comprises tool names drawn in reverse order, location sites of model data, ownership group names and other pertinent information. The location sites points to the appropriate set of data in the bulk data 21 for each object. As set forth above, the metadata is stored in the metaserver 10, while the bulk data 21, for example, is stored in a bulk server 20 of the appropriated department. Device and component constitution information are controlled by the link relationships between the component numbers, object numbers, their attribute information and the raw data (model data) as shown in FIG. 4.

The component constitution information definition processor 31, as shown in FIG. 2, defines the parent/child relationship of the various components in a device. In the present example, components constituted from component number a1 and component number a2 are defined in metadata and registered in the metaserver 1. Each workstation 30 can grasp the complete or partial constitution information of any design object manufacturing object, i.e., the various devices and components that from the object.

The object information/attribute information definition processor 32 defines the object number of each component. The object number is defined as metadata to maintain a cooperative relationship between the component number and the object number. The object information I attribute information definition processor 32 also defines, for each object number, attribute information including: implementation tool information, authority information, management basis information (ownership group name information), and bulk location information.

The model data import processor 33 imports/transfers bulk data (model data) to the bulk server 20 defined in the bulk location information.

Figure 5A:
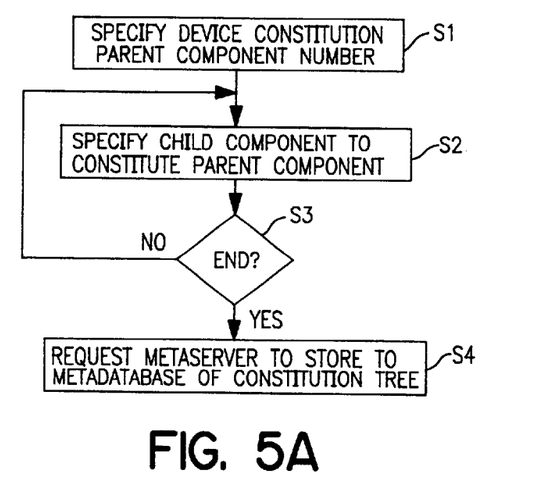
FIG. 5A is a flow chart of the operation of a component constitution information definition processor.
Figure 5B:
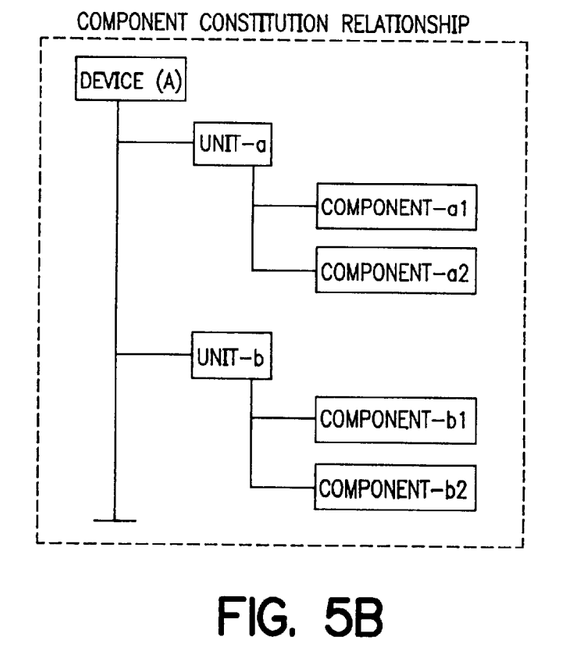
FIG. 5B is a diagram of a component constitution relationship.

FIG. 5A is a flow chart of the component constitution information definition processor 31. The component constitution information definition processor 31, defines the parent/child relationship of the constitutional components as shown, by example, in FIG. 5B.

In step S1, a device constituent parent component number is specified. For example, in the component constitutional relationship shown in FIG. 5B, the component number of device (A) is specified. Next, in a loop comprising steps S2 and S3, the child components which constitute the parent component are specified in a sequential hierarchy. In the example shown in FIG. 5B, the next unit-a and unit-b of device A are defined. Furthermore for the unit-a, component a1 and component a2 are defined, while for unit b components b1 and b2 are defined. Finally, in step S4, a request to the metaserver 10 is issued to store the definition information of the components in the metadatabase 11.

Figure 6A:
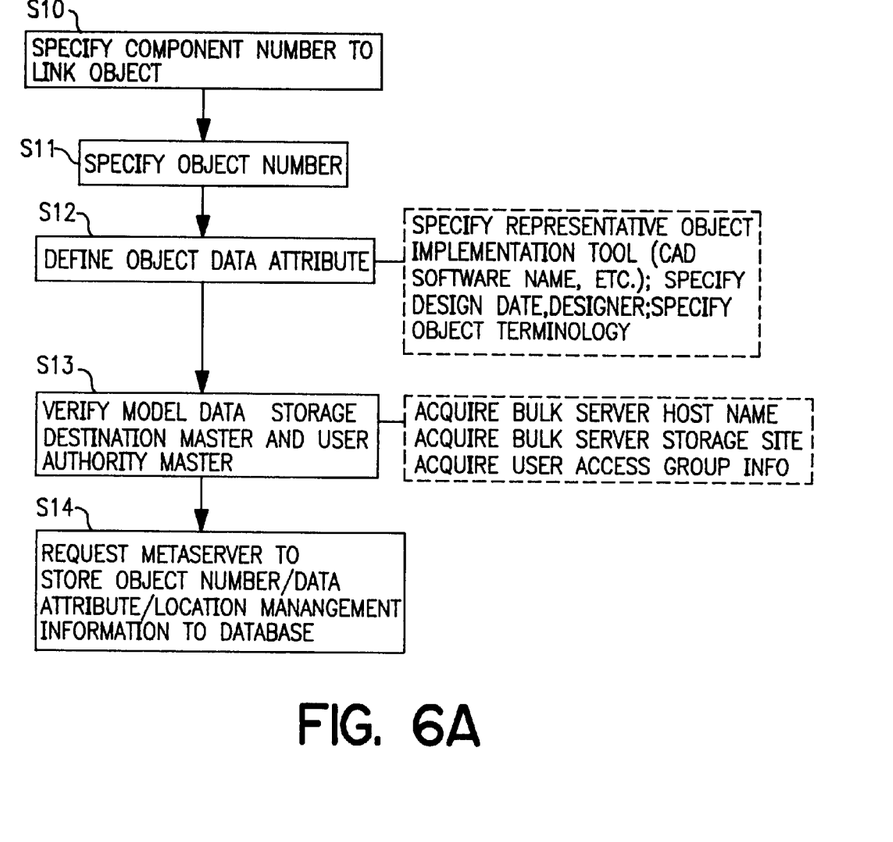
FIG. 6A is a flow chart of the operation of an object information/attribute information definition processor.

FIG. 6A is a flow chart of the operation of the object information/attribute information definition processor 32. The object information/attribute information definition processor 32, defines the object number for each component and in addition, for each defined object number, defines the data storage destination (machine name/location place), user authority information, implementation tool name and other pertinent attribute information.

In step S10, a component number is specified to link the object. Next, in step S11, a unique object number is defined. In step S12, the representative object implementation tool, design date, designer, object name and other object data attributes are specified. In step S13, bulk server host names, bulk server storage places, and user access group information are acquired from the model storage destination master table 15, and the user authority master table 14 in the metadatabase 11. Additionally, the acquired data and the newly defined data is verified. Continuing, in step S14, the metaserver 10 is requested to store the object number and associated data attributes (defined in step S12) and the location management information (acquired in step S13).

Figure 6B:
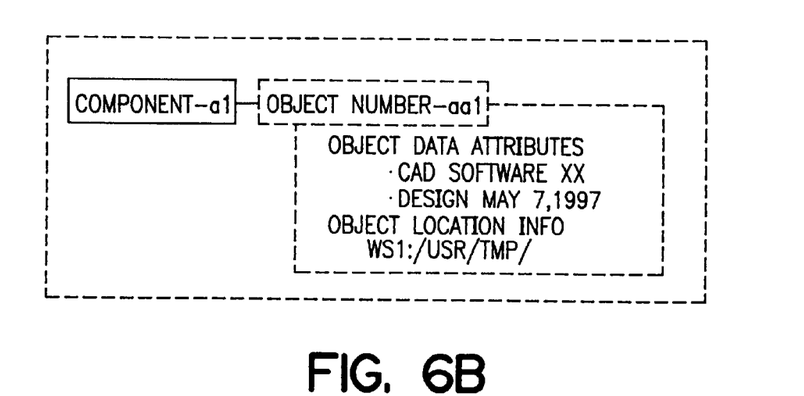
FIG. 6B is a block diagram of a definition of a component.

FIG. 6B is a diagram showing the definition of a component. The object number aa1 is assigned to component a1. Object data attribute including: prepared CAD software name; design date; and object location information (WS1:/usr/tmp) are defined for the object number.

Figure 7A:
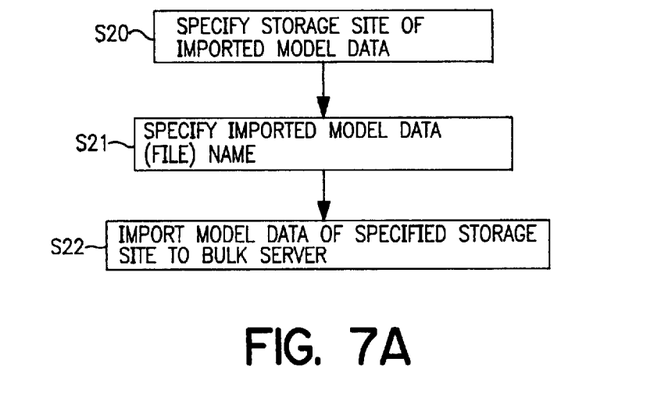
FIG. 7A is a flow chart of the operation of a model data import processor.
Figure 7B:
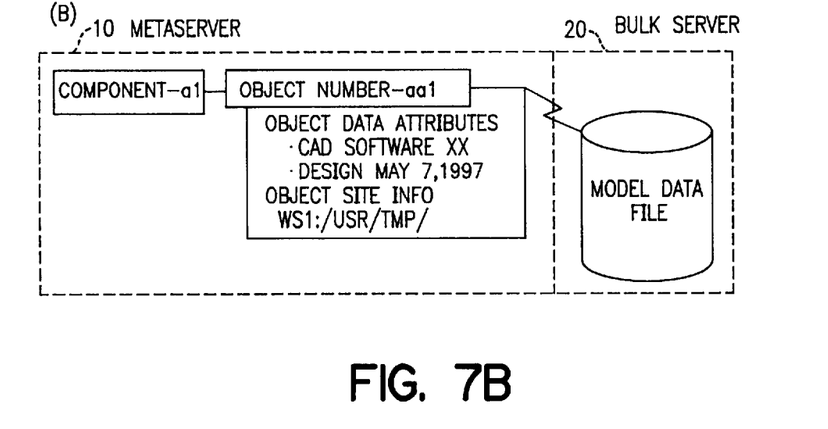
FIG. 7B is a diagram showing the relationship between the metaserver and the bulk server.

FIG. 7A is a flow chart of the model data import processor 33. The model data import processor 33, based on the information defined by the object information/attribute information definition processor 32, imports/transfers the model data to the bulk server 20 from the workstation 30. As shown in FIG. 7B, the constitutional information of each component, object number and attribute info, and a series of connections (all stored on the metaserver 10) are formed with the model data file in the bulk server 20.

In step S20, a storage location is specified for the imported model data. Next, in step S21, model data in the workstation 30 is stored and a file name is specified. Finally, in step S22, the model data from a specified storage location is imported/transferred to the bulk server 20.

Figure 8:
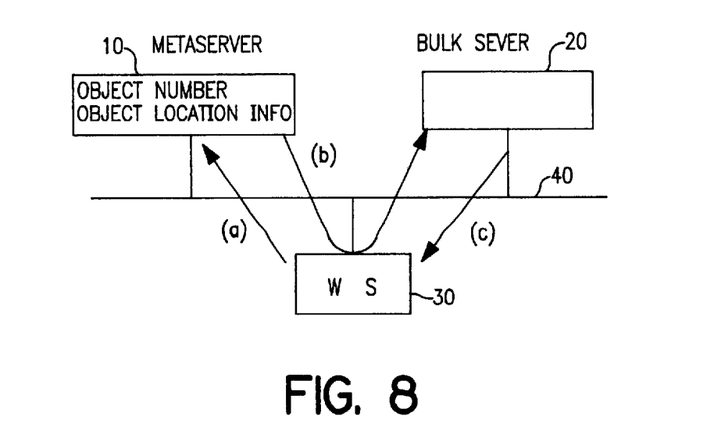
FIG. 8 is a diagram illustrating a model data export process.

FIG. 8 is a diagram illustrating a model data export process. The model data export processor 34 acquires for its own workstation 30, model data (from the bulk data 21) referenced by a specified object number. In particular, in the case of 3-dimensional model data, one model datum is not sufficient, so there has to be a series of transfers of bulk data to form a complete assembly model or a component model (parts model). In accordance with the present invention, the constitution number (i.e., the component number) for a specified object number, acts as top information of a constitutional component, and indexes the required lower rank components. Based upon attribute of object numbers linked to lower rank components data groups may be extracted batchwise.

To export model data from the bulk servers 20, the workstation 30, using a specified component number or object number, acquires object location information from the metaserver 10 (arrow (a)). Next, the workstation 30, requests access from a bulk server 20 in which the required bulk data 21 is stored (arrow 8(b)). The required bulk data 21 located in the bulk server 20 is then copied into an export destination region in the workstation 30 (arrow (c)).

Figure 9A:
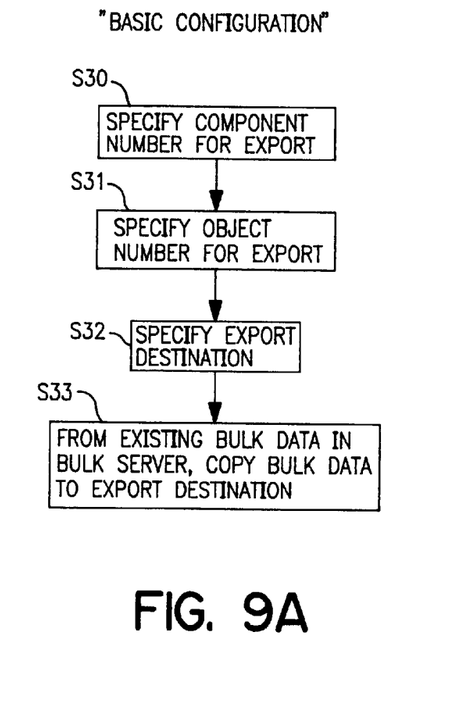
FIGS. 9A and 9B are flow charts of the operation of a model data export processor.

FIG. 9A is a flow chart of the operation of the model data export processor 34. In step S30, an export component number is specified. In step S31, an object number is specified. Next, in step S32, an export destination is specified. In step S33, using the location site of the bulk data, obtained from the metaserver 10, bulk data is copied from the bulk server 20 to the export destination, using a workstation 30.

Figure 9B:
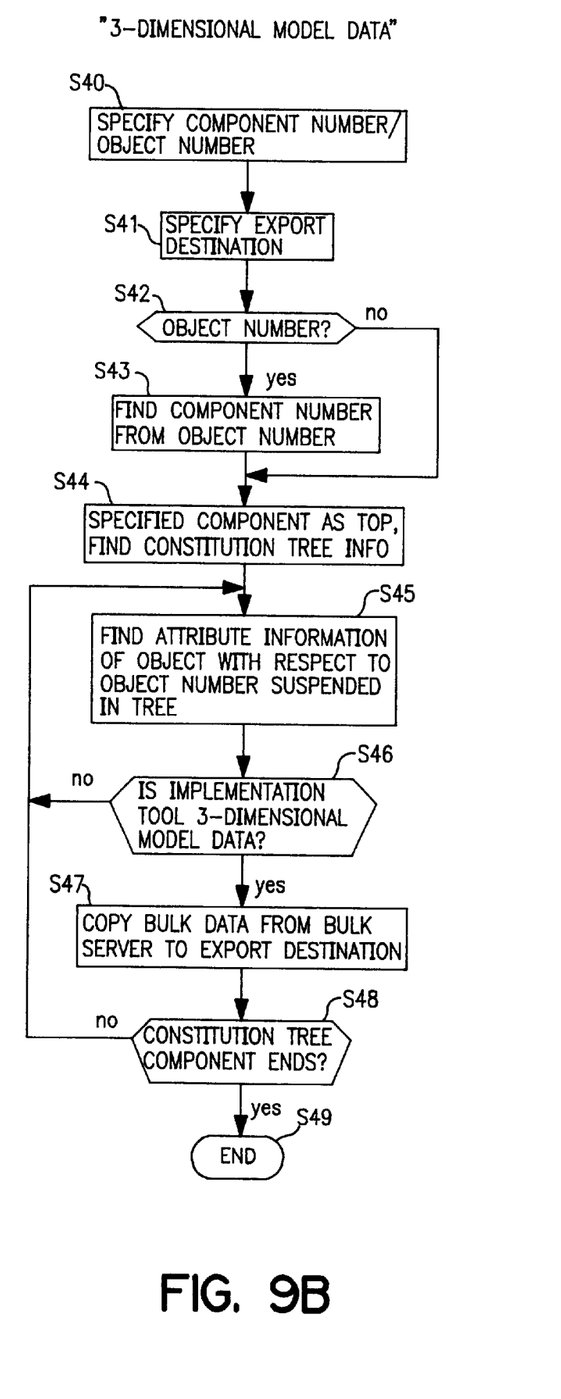

FIG. 9B shows the process with respect to export of 3-dimensional model data, requiring a batch collection of model data describing a group of plural components. In step S40, an export component number/object number is specified. In step S41, an export destination is specified. When, in step S42, an object number was specified, the process proceeds to step S43 and a component number is found from the object number. In any event, in step S44, a constitution tree information is located on the metaserver 10 as used and a top specified component number.

In step S45, attribute information is found for the object (based on the object number) suspended in the constitution tree. In step S46, a determination is made as to whether the implementation tool of the object, based on the attribute information, is one which implements 3-dimensional model data. If the object does not implement 3-dimensional model data a return is made to step S45 and the process is repeated for the next object number.

If the implementation tool of the object implements 3-dimensional data the process proceeds to step S47 and, based on the location site of the bulk data obtained from the metaserver 10, bulk data is copied from a bulk server to the export destination. In step S48, it is determined whether the extraction has ended for the components of all the constitution trees. If the extraction has not ended, a return is made to step S45. Otherwise, the process end in step S49.

Figure 10:
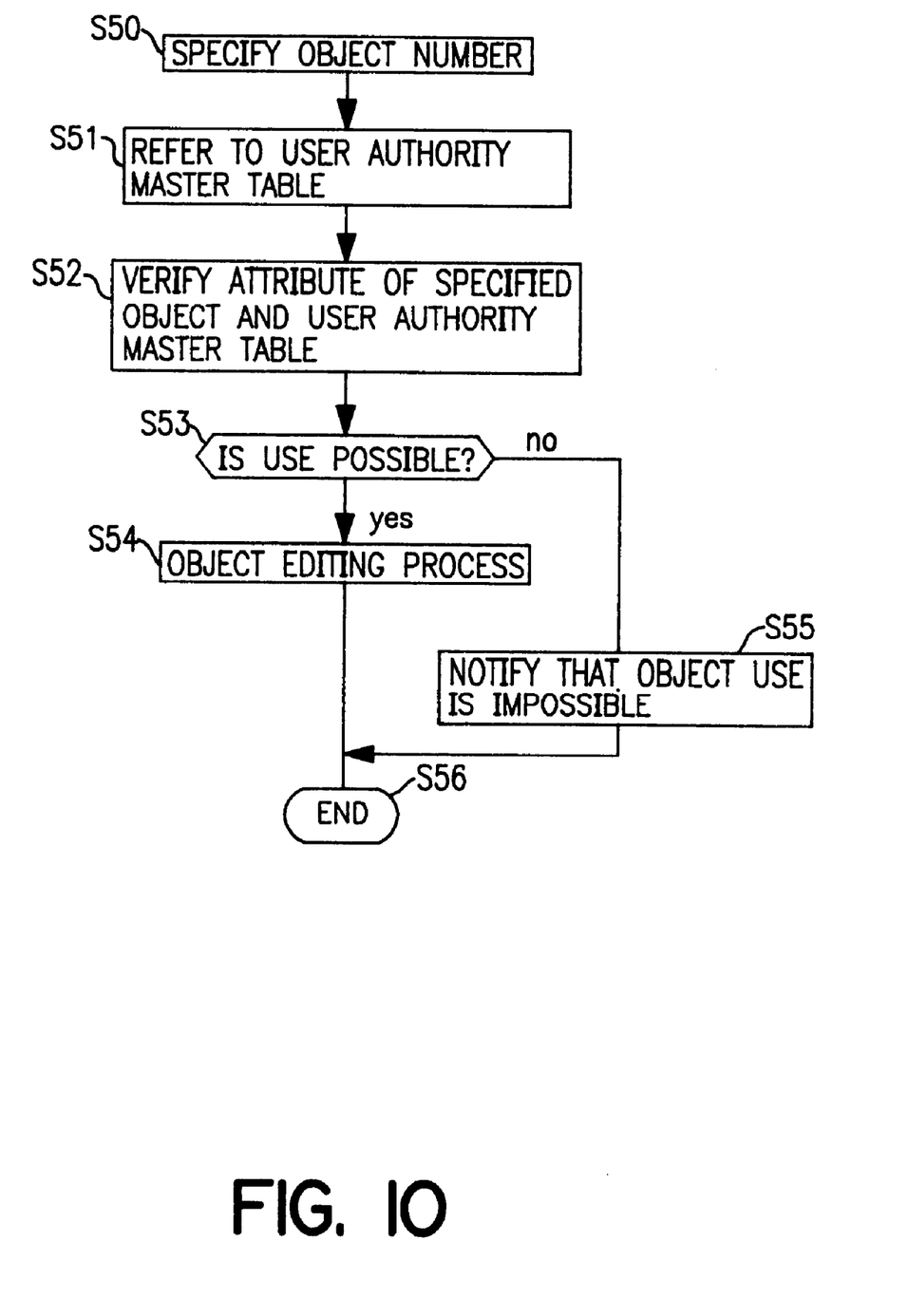
FIG. 10 is a flow chart of the operation of an object processor which checks whether an object change is permissible, i.e., checks the propriety of object changes.

FIG. 10 is a flow chart of the operation of the processor 35 which checks whether an object change is permissible. The processor 35 which checks propriety of the object changes checks, for any object specified by the user, whether changes are approved for the user based on the attribute information in the user authority master table 14. If there is no such authority, the user is notified that editing is impossible.

In step S50, an object number of an object which may be changed is specified. In step S51, the user authority master table 14, managed by the metaserver 10, is consulted. Then, in step S52, the attribute of the specified object and the data of the user authority master table 14 is verified. A determination is made in step S53, whether the change of the object is approved, for the user, using the user authority master table 14. If the change is approved, the process proceeds to step S54 and the object editing process is performed. If the change is not approved, in step S55 the user is notified that the change is impossible, and the process ends in step S56.

Figure 11:
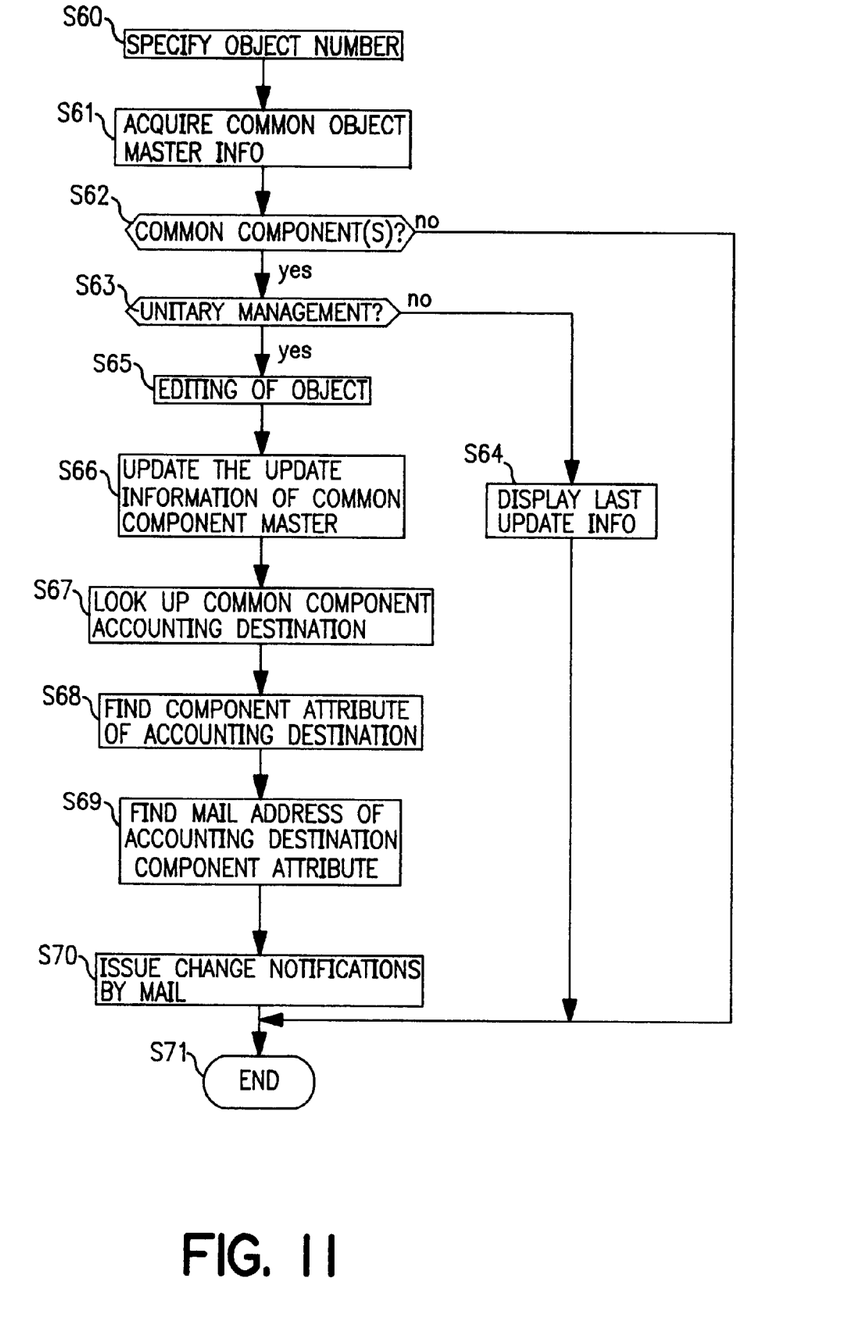
FIG. 11 is a flow chart of the operation of a common component change notification processor.

FIG. 11 is a flow chart showing the process of the common component change notification processor 36. The common component change notification processor 36, when the subject object is a common component of a 3-dimensional model and when a common component manager (or user) has changed the information of this component, looks up the object number(s) which use(s) the changed component and notifies the changes to the users of the affected object(s).

In step S60, the object number, of the component which has changed, is specified. In step S61, master information of the component, designated by the object number, is acquired from the common components master table 13 on the metaserver 10. In step S62, it is determined whether the specified object number relates to a common component. If, in step S62, there are no common components, the process ends.

If, in step S62, there are common components, it is determined in step S63 whether the changer of common components is unitary management. If the changer is not unitary management, the last update information of common components is displayed in step S64, and the process ends.

If the changer is unitary management, the process proceeds to step S65, and editing the object is performed. In step S66, update information within the common components information master table 13 is updated. Continuing, in step S67, the accounting destination of the component is looked up. In step S68, the component attribute of the accounting destination found. In step S69, a mail address of the accounting destination component attribute. Subsequently, in step S70 a change notification of the common components is issued. The information is typically issued via e-mail. The e-mail recipient is notified of, and able to cope with, the changes of common components. The process ends in step S71.

Figure 12A:
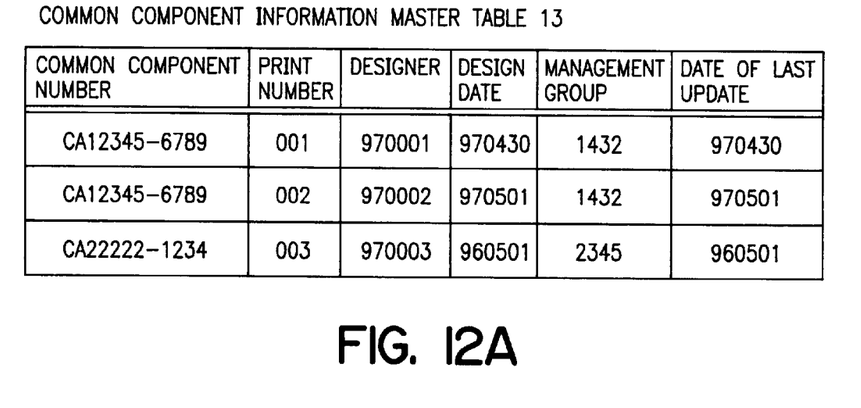
FIGS. 12A, 12B, and 12C are illustrations of the various master tables used in the present invention.
Figure 12B:
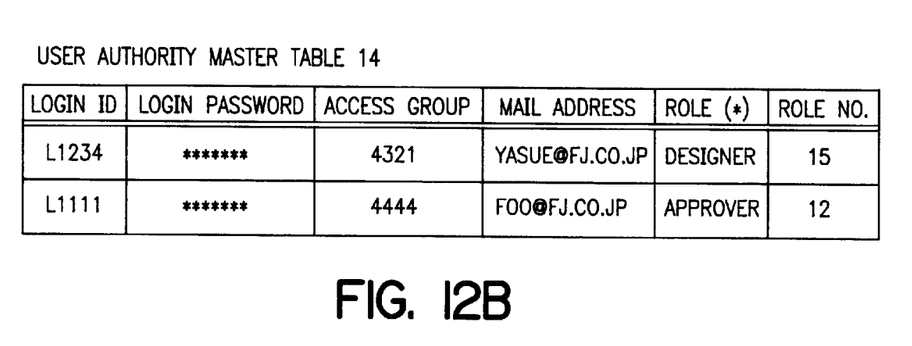
Figure 12C:
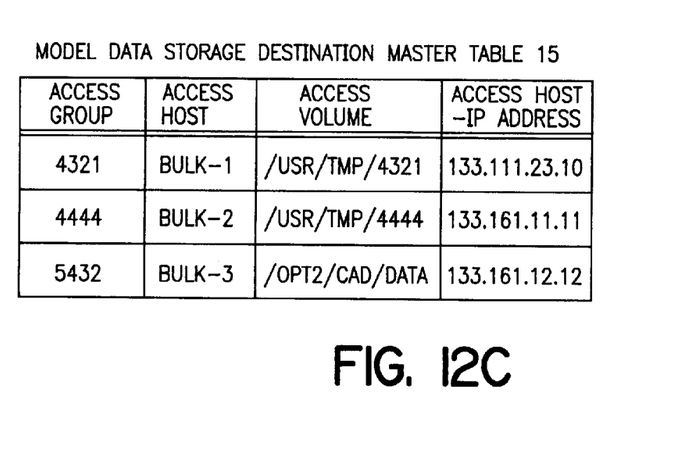

FIGS. 12A, 12B and 12C show examples of the various master tables in the metadatabase 11.

The common components information master table 13, as shown in FIG. 12A, is indexed, according to common component number, and has entries for print number, designer, design date, number of management group, and the date of last update.

The user authority master table 14, as shown in FIG. 12(B), is indexed by user and stores login IDs, passwords, access groups (office) affiliated to, mail address, access groups (office) affiliated to, mail address, roles (for example, designer or approver), a role number of user, and the like. The role typically is used as access authority information, but access authority may be determined by other formalities or procedures.

The model data storage destination master table 15, as shown in FIG. 12(C) is indexed by access groups and stores machine names of access host, access volumes (directory and the like), and the ip addresses of the access host.

The attribute information shown in FIG. 4, maintains the information showing records (entries) of tables 13, 14 and 15. Furthermore, the table constitution shown in FIGS. 12A, 12B and 12C is used only by way of example, and the master tables can, of course, have various other information in various formats.

In accordance with the present invention the following effects are achieved:

(1) Because the series of relationships from constitution component number to object number and object data are maintained, data cooperation becomes a reality.

(2) It becomes possible to manage the device or components by constitution information regarding the device or components.

(3) It becomes possible to extract 3-dimensional groups from device/component constitution and object information.

(4) The management of changes of common components is easily performed and notification of changes is performed in real time.

(5) Because metadata information and the bulk data information unwarily managers, it is unnecessary to manage them individually.

Although a preferred embodiment of the present invention have been shown and described, it will be appreciated by those skilled in the art that changes may be made in this embodiments without departing from the principles and spirit of the invention, the scope of which is defined in the claims and their equivalents.

What is claimed is:

1. A design information management system, comprising:
   a metaserver which unwarily manages management information about model data expressing the shape of an item, said management information including constitutional information relating to devices and components formed by the model data;
   a plurality of bulk servers storing the model data;
   at least one design information access device which processes model data by acquiring the management information about the model data from said metaserver and, based on the management information, accesses the appropriate bulk server storing the requested model data; and
   a network which connects said metaserver, said plurality of bulk servers and said at least one design information access device.

2. A design information management system in accordance with claim 1, wherein
   the management information includes information indicating which model data is 3-dimensional.

3. A design information access device comprising:
   a metaserver which unwarily manages management information about model data expressing the shape of an item;
   a plurality of bulk servers which store the model data;
   a network connecting the metaserver and the plurality of bulk servers together;
   definition means for creating and storing the management information on said metaserver including constitutional information relating to devices and components defined in the model data and attribute information indicating model data storage sites for objects related to the devices and components;
   import means for importing to said bulk servers, implemented or updated model data, based on the information indicating model data storage sites in the attribute information of the objects; and
   export means for exporting model data from said bulk servers based on the information indicating model data storage sites in the attribute information of objects.

4. A design information access device in accordance with claim 3, wherein the attribute information further includes user authority information indicating the ability of a user to change a particular object; and
   further comprising:
   change means which, when model data or objects are updated, accesses the user authority information and checks the ability of a user to change the model data and objects.

5. A design information access device, in accordance with claim 3, wherein the constitution information and the attribute information has information which shows whether the individual components are used in plural devices or components are common components; and
   further comprising:
   change notification means which, when the attribute information of model data or an object is updated, checks whether the model data or object is part of a common component and when the model data or object is part of a common component, notifies users of the changes of common components.

6. A design information access device, in accordance with claim 3, wherein said export means extracts 3-dimensional model data, related to component groups in a parent-child relationship batchwise, from the constitution information.

7. A program memory medium comprising:
   a memory medium which stores programs for use in a design information access device, the memory medium storing a program executed by a processor connected to a metaserver, which provides unitary management of management information of model data expressing the shape of an item, and a plurality of bulk servers which maintain individual model data;
   definition means for storing, in the metaserver, constitutional information relating to devices and components formed by the model data, and attribute information including information indicating the model data storage sites of objects relating to the devices and components;

import means for storing to the bulk servers, model data which has been created or updated, based on the information indicating the model data storage site; and export means for storing the model data from the bulk servers.

8. A CAD system comprising:

at least one bulk server storing CAD data comprising a plurality of model data expressing the shape of component objects;

a metaserver storing and unwarily managing management information, including an address on the at least one bulk server, for the CAD data and metadata indicating which model data are used to form a device;

a network connecting the at least one bulk server and the metaserver;

a workstation connected to the network which retrieves required CAD data by accessing the metaserver to obtain an address for the required CAD data and subsequently retrieving the required CAD data from the at least one bulk server.

9. A CAD system, as set forth in claim 8, wherein the at least one bulk server comprises a bulk server for every department using the CAD system and wherein the model data created by each department resides on the corresponding bulk server.

10. A CAD system, as set forth in claim 8, further comprising a user authority master table indicating the authority of each user to modify the model data.

11. A method of storing design information comprising:

creating model data indicating a shape of an object and creating a centrally managed metadata specifying a device to which the object belongs and defining parent/child relationship of the object with other objects forming the device;

identifying a bulk server and a location on the bulk server at which the model data is to be stored;

storing the model data on a bulk server at the location; and storing the metadata on a metaserver.

12. A method, as set forth in claim 11, wherein the step of identifying a location comprises identifying a bulk server from among a plurality of bulk servers and identifies a location on the identified bulk server onto which the model data is stored.

13. A method, as set forth in claim 11, further comprising:

forming a user authority master table indicating the authority of a user to modify the object data.

14. A method, as set forth in claim 11, wherein the identified bulk server and location are part of the metadata.

15. A system managing design information and in communication with bulkservers, the bulkservers storing model data expressing shape of an item having devices and components, the system comprising:

a metaserver unwarily creating and storing management information about the model data, the management information having constitutional information specifying the devices and components and defining parent/child relationship of the devices and components, creating and storing attribute information indicating storage sites of each model data corresponding to the devices and components, importing to said bulk servers, implemented or updated model data based upon the attribute information, and exporting the model data from said bulk servers based on the attribute information.

* * * * *

UNITED STATES PATENT AND TRADEMARK OFFICE
CERTIFICATE OF CORRECTION

PATENT NO.    : 6,289,345 B1
DATED         : September 11, 2001
INVENTOR(S)   : Mitsuru Yasue It is certified that error appears in the above-identified patent and that said Letters Patent is hereby corrected as shown below:

<u>Title page,</u>
Item [57] ABSTRACT, line 2, change "inwarily" to -- unitarily --.

<u>Column 10,</u>
Line 9, change "unwarily" to -- unitarily --;

<u>Column 11,</u>
Line 11, change "unwarily" to -- unitarily --;

<u>Column 12,</u>
Line 21, change "unwarily" to -- unitarily --.

Signed and Sealed this

Twenty-eighth Day of May, 2002

Attest:

*Attesting Officer*

JAMES E. ROGAN
*Director of the United States Patent and Trademark Office*